(No Model.)
S. R. HARRY.
GOPHER TRUCK.
No. 405,960. Patented June 25, 1889.
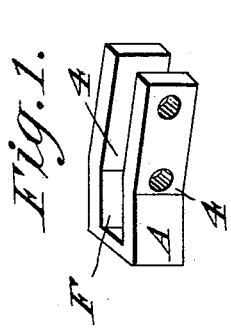
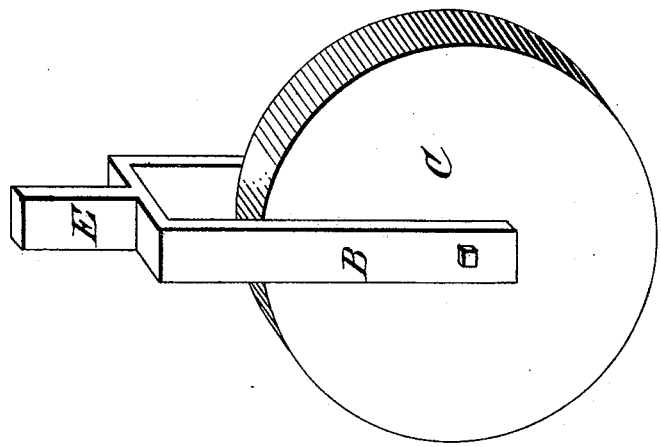
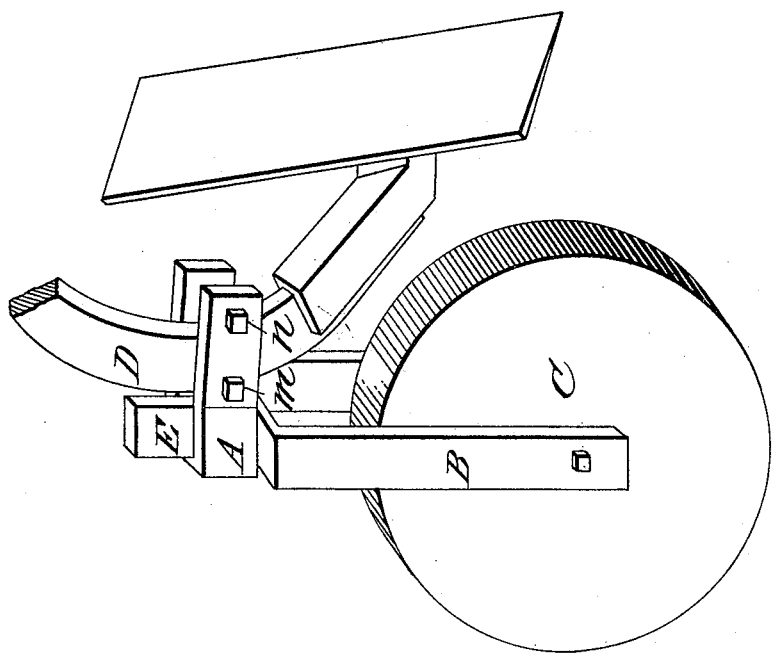
Witnesses:
L. Y. Harry
K. Y. Vail
Inventor:
Samuel R. Harry

UNITED STATES PATENT OFFICE.

SAMUEL R. HARRY, OF CHATSWORTH, ILLINOIS.

GOPHER-TRUCK.

SPECIFICATION forming part of Letters Patent No. 405,960, dated June 25, 1889.

Application filed February 28, 1889. Serial No. 301,587. (No model.)

*To all whom it may concern:*

Be it known that I, SAMUEL R. HARRY, a citizen of the United States, residing at Chatsworth, in the county of Livingston and State of Illinois, have invented a new and useful Gopher-Truck, of which the following is a specification.

The object of my invention is for convenience of transfer from place to place about the farm of the agricultural implement known as a "gopher."

Figure 1 is a clamp to be bolted onto gopher-leg D by bolts $m$ and $n$, as represented in Fig. 3. Fig. 2 represents wheel E B and wheel C, with arm E. Arm E passes into socket F, Fig. 1, as represented in Fig. 3. Fig. 3 represents Figs. 1 and 2 combined for use.

A set of these trucks is to be fastened on the two hind legs or two fore legs, as the user may choose.

Clamp A, Figs. 1 and 3, and wheel-frame E B, Fig. 2, are to be made of wrought-iron bars, about one and one-half inch wide and about three or four sixteenths thick, doubled and shaped as represented in figures and letters referred to, or they may be cast. Clamp A is bent a little sidewise at 4 to let the wheels run straight.

The wheel C is about a foot in diameter and two inches thick, cheap, and easily made of two-inch plank.

To use the trucks, bolt the clamp A, Figs. 1 and 3, on the hind legs of the gopher. They should be allowed to remain. The gopher is then always ready to be mounted by slipping the arm E, Figs. 2 and 3, into the socket F, Fig. 1, as represented in Fig. 3. These are readily removed by raising the gopher and allowing them to drop out.

What I claim as my invention, and desire Letters Patent on, is—

In a gopher-truck, the combination of clamp A, socket F, wheel-frame E B, and wheel C, as set forth.

SAMUEL R. HARRY.

Witnesses:
L. T. HARRY,
B. M. VAIL.